July 29, 1947.  T. COLOMBO  2,424,799
TRACTION-INCREASING WHEEL
Filed April 9, 1945  2 Sheets-Sheet 1

Inventor
Tullio Colombo

By *Clarence A. O'Brien
and Harvey B. Jackson*
Attorneys

July 29, 1947.　　　　T. COLOMBO　　　　2,424,799
TRACTION-INCREASING WHEEL
Filed April 9, 1945　　　2 Sheets-Sheet 2
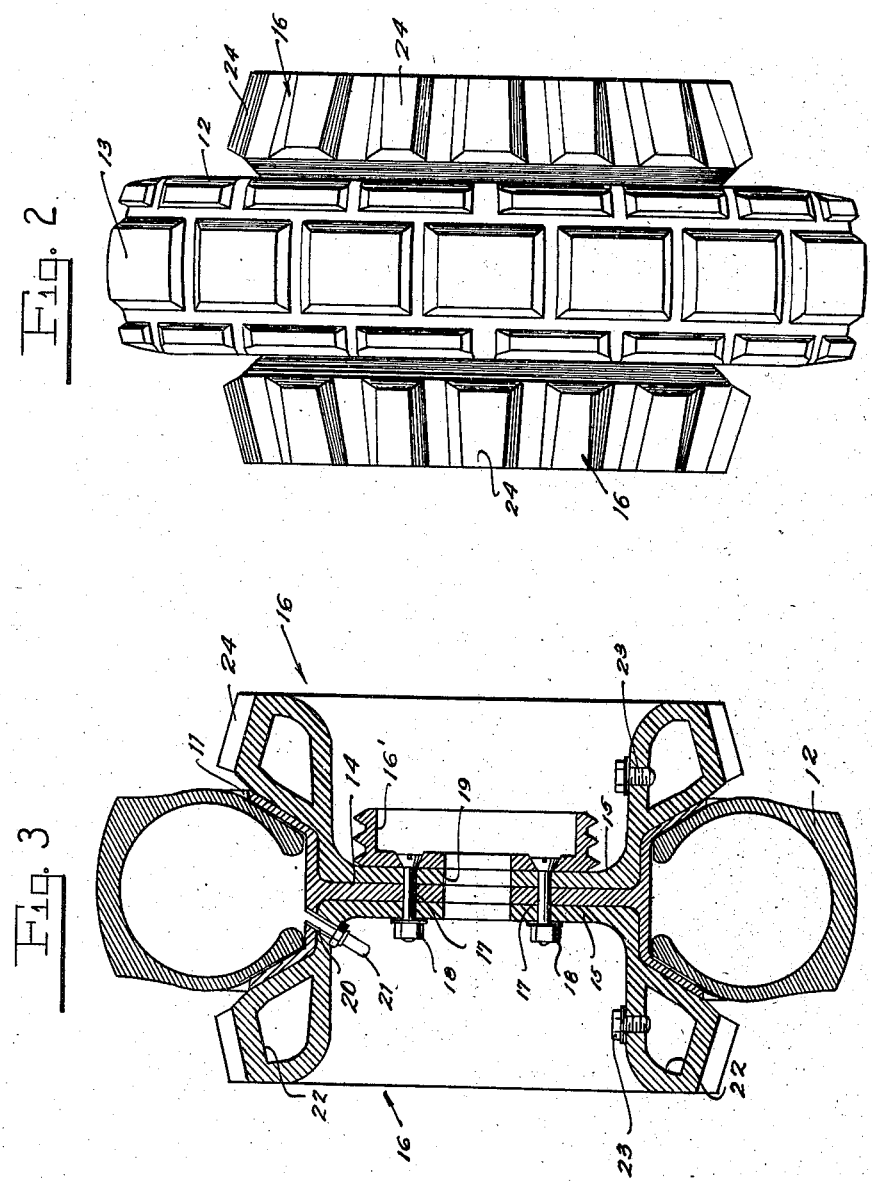
Inventor
Tullio Colombo Patented July 29, 1947

2,424,799

UNITED STATES PATENT OFFICE 2,424,799

TRACTION-INCREASING WHEEL

Tullio Colombo, Milan, Italy

Application April 9, 1945, Serial No. 587,325

1 Claim. (Cl. 301—41)

This invention relates to a vehicle wheel, and more particularly to such a wheel particularly adapted for the use of vehicles adapted to traverse soft, boggy, sandy, or on other ground on which traction is apt to be difficult.

A primary object of this invention is the provision of an improved wheel, including means for increasing the tractive effect of the wheel of a vehicle, when the same is embedded in sandy, soft or swampy soil.

An additional object of this invention is the provision of such a device which will have no effect on the normal tractive force of the vehicle when travelling on a hard surface, such as a road or the like.

Still another object of the invention is the provision of such a device provided with means whereby the tractive effect of the wheels is progressively increased in accordance with the softness of the ground.

A still further object of this invention is the provision of such a wheel having means, whereby the same may be readily weighted, and by sand, water, or the like to increase the tractive effect on hard but slippery surfaces.

Other objects reside in the provision of such a wheel, which may be readily applied to any existing vehicle, with but slight modifications thereof, and which is a particular utility in connection with such vehicles as tractors, scout cars, "jeeps," other military vehicles, and similar cars.

Other objections reside in the combinations of elements, arrangements of parts, features of construction, all as will be more fully pointed out hereinafter and disclosed in the accompanying drawing wherein there is shown a preferred embodiment of this inventive concept.

In the drawings:

Figure 2 is an end elevational view of the device shown in Figure 1, and

Figure 3 is a sectional view taken substantially along the line 3—3 of Figure 1 as viewed in the direction indicated by the arrows.

Similar reference characters refer to similar parts throughout the several views of the drawings.

Figure 1:
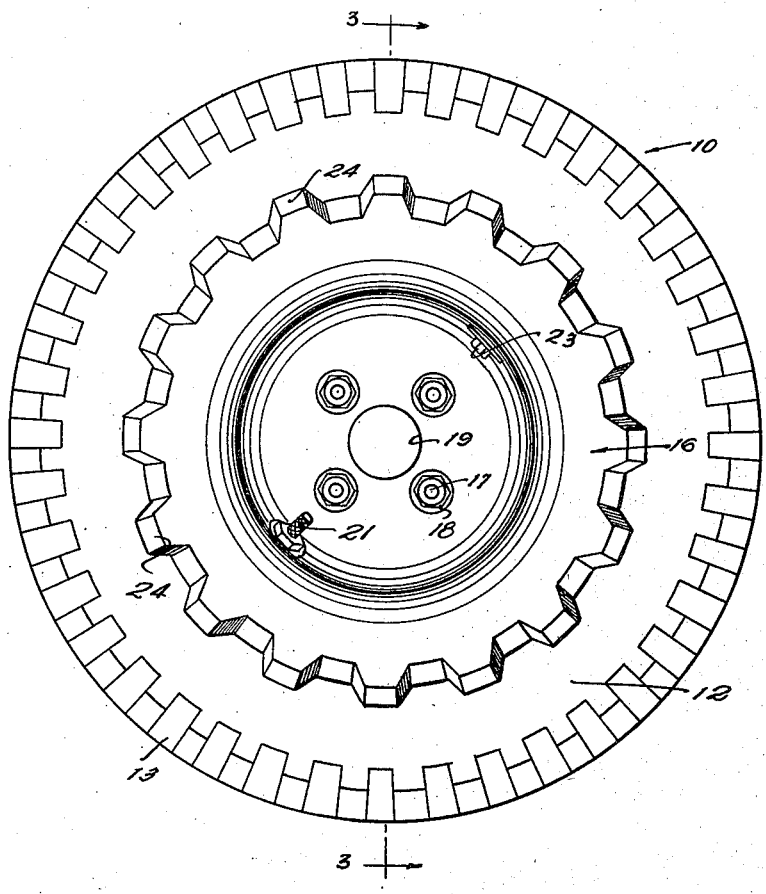
Figure 1 is a side elevational view of one form of wheel embodying features of this inventive concept.

Having reference now to the drawings, there is generally indicated at 10, a vehicle wheel including a rim 11 (see Figure 3), upon which is adapted to be mounted a pneumatic tire 12, preferably of the type provided with a relatively heavy duty traction tread as indicated at 13 (see Figure 2).

The rim 11 comprises a portion of a flange 14, on opposite sides of which are positioned auxiliary flanges 15, with oppositely disposed traction members generally indicated at 16, to be more fully described hereinafter. The flanges 14, together with an associated brake drum 16' are adapted to be secured together by a plurality of bolts 17, secured in related assembly as by nut 18.

Suitable aligned apertures 19 through the flanges and brake drum, as best shown in Figure 3 permits the passage of an axle through the wheel, in conventional manner.

A suitable aperture through the outer of member 16, is provided with a tire valve generally indicated at 20, and a cap 21, to permit inflation of the pneumatic tire 12.

The members 16, with the exception of the aperture for the tire valve previously mentioned are substantially identical in construction as each is comprised of an annulus, and a diameter less than the external diameter of the pneumatic tire 12, with the particular dimension being governed by the use to which the vehicle is to be put, and each is provided with an interiorly disposed peripheral channel 22, normally empty, to which access may be had as by means of screw plugs 23. The outer surfaces of the members 12 are provided with spaced lugs 24, angled or bevelled outwardly with respect to the tire 12, the arrangement being such that the overall diameter of each of the members 16 is greater adjacent the tires 12, than at its outermost point spaced away from the tire.

From the foregoing the operation of the device should now be readily understandable. On hard surfaced roads or other good tractive surfaces, the weight of the vehicle is normally supported by the pneumatic tire, and its slightly soft surfaces of the treads 13 is normally sufficient to add the requisite tractive force to the wheels as may be necessary. However, in the event that the device sinks into exceptionally soft ground, the wheel gradually sinks until the lugs 24 engage the surface of the soft ground on opposite sides of the tire thus increasing not only the tractive force by the additional lugs 24, but also the overall width of the vehicle wheel, which is particularly effective in the ground already compressed by the sinking of the tire 12 thereinto. In only comparatively soft ground, only the inner edges of the lugs 24 will engage the ground, but as the ground becomes progressively softer more and more of the lugs will be engaged, thus progressively increasing the tractive effect of the vehicle wheel as may be necessary.

On normally hard but slippery surfaces, the tractive effect of the vehicle may still further be increased, by lowering the center of gravity thereof, and increasing the weight thereof merely by filling the channels 22, by means of the plugs 23 with water, sand, or other fluid or semi-fluid substance to give added weight to the vehicle.

From the foregoing it will now be seen that there is herein provided an improved wheel for vehicles, so arranged and designed to increase the tractive effect of the vehicles under such conditions as may be necessary, which will provide a means whereby a vehicle may under all except the most abnormal circumstances readily extract itself from ground in which the same would otherwise become stuck.

It will also be seen that there is herein provided a device accomplishing all the objects of this invention, including many advantages of great practical utility and commercial importance.

As many embodiments may be made of this inventive concept and as many modifications may be made in the embodiment hereinbefore shown and described, it is to be understood that all matter herein is to be interpreted merely as illustrative and not in a limiting sense.

I claim:

In a tractive wheel for vehicles, the combination of a flange, a rim carried by said flange, a pneumatic tire carried by said rim, a valved stem secured to said tire, a brake drum, and a pair of oppositely disposed flanged auxiliary tread members secured to opposite sides of said first-mentioned flange, said auxiliary tread members being shaped to intimately embrace the flange and rim, said auxiliary tread members being provided with recesses therein adapted to contain material to add weight and hence tractive effect to the wheel, said recesses comprising peripheral channels having inlets opening toward the axis of rotation of the auxiliary tread members and closure means for said inlets, said valved stem extending through said rim and through one of said auxiliary tread members, and common holding means securing said rim and both said auxiliary tread members to said brake drum.

TULLIO COLOMBO.

REFERENCES CITED

The following references are of record in the file of this patent:

UNITED STATES PATENTS

| Number | Name | Date |
|---|---|---|
| 1,384,170 | Vincent | July 12, 1921 |
| 2,336,959 | Redman | Dec. 14, 1943 |
| 1,110,156 | Stewart | Sept. 8, 1914 |
| 1,257,778 | Allen | Feb. 26, 1918 |
| 1,446,427 | Matteson | Feb. 20, 1923 |